United States Patent
Stegmann et al.

(10) Patent No.: US 11,385,436 B2
(45) Date of Patent: Jul. 12, 2022

(54) METHOD FOR DETERMINING A DEVIATION ON A DISPLACEMENT PATH OF AN OPTICAL ZOOM LENS AND METHOD FOR CORRECTION AND IMAGE RECORDING DEVICE

(71) Applicant: CARL ZEISS MICROSCOPY GMBH, Jena (DE)

(72) Inventors: Daniel Stegmann, Grossschwabhausen (DE); Daniel Harangozo, Gauting (DE); Peter Schacht, Erfurt (DE); Thomas Milde, Nausnitz (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 270 days.

(21) Appl. No.: 16/482,297

(22) PCT Filed: Jan. 19, 2018

(86) PCT No.: PCT/EP2018/051295
§ 371 (c)(1),
(2) Date: Jul. 31, 2019

(87) PCT Pub. No.: WO2018/141560
PCT Pub. Date: Aug. 9, 2018

(65) Prior Publication Data
US 2019/0346659 A1    Nov. 14, 2019

(30) Foreign Application Priority Data
Jan. 31, 2017   (DE) ..................... 10 2017 101 824.7

(51) Int. Cl.
*G02B 7/10* (2021.01)
*G02B 15/14* (2006.01)
(Continued)

(52) U.S. Cl.
CPC ................ *G02B 7/10* (2013.01); *G01B 11/02* (2013.01); *G02B 13/20* (2013.01); *G02B 15/14* (2013.01);
(Continued)

(58) Field of Classification Search
CPC ........ G01B 11/02; G02B 13/20; G02B 15/14; G02B 27/32; G02B 27/62; G02B 7/10;
(Continued)

(56) References Cited

U.S. PATENT DOCUMENTS 8,237,821 B2   8/2012  Nanba
8,860,827 B2   10/2014 Yamamoto
(Continued)

FOREIGN PATENT DOCUMENTS

EP    1870668    12/2007

*Primary Examiner* — Joseph P Martinez
*Assistant Examiner* — Vipin Patel
(74) *Attorney, Agent, or Firm* — Stuart H. Mayer; Mayer & Williams PC

(57) ABSTRACT

The invention relates firstly to a method for determining a mechanical deviation on a displacement path of an optical zoom lens (03), in particular on a displacement path of an optical zoom lens (03) of a microscope. The optical zoom lens (03) is arranged in a beam path (01) between an object (19) to be recorded and an electronic image sensor (04). In a first method step, an optical marker is introduced into the beam path (01) at a position of the beam path (01) located between the object (19) to be recorded and the optical zoom lens (03), such that the optical marker passes the optical zoom lens (03) and then is depicted on an image in which a position of the optical marker is detected and determined. This is compared with a reference position of the optical marker in order to determine the mechanical deviation on the displacement path of the optical zoom lens (03). The invention further relates to a method for correction of a
(Continued)

displacement error of an image recorded by an electronic image sensor (04) and to an electronic image recording device.

8 Claims, 10 Drawing Sheets

(51) Int. Cl.
*G02B 27/32* (2006.01)
*G02B 27/62* (2006.01)
*H04N 5/232* (2006.01)
*G06T 7/70* (2017.01)
*G02B 13/20* (2006.01)
*G01B 11/02* (2006.01)

(52) U.S. Cl.
CPC ............ *G02B 27/32* (2013.01); *G02B 27/62* (2013.01); *G06T 7/70* (2017.01); *H04N 5/23212* (2013.01); *G03B 2205/0046* (2013.01)

(58) Field of Classification Search
CPC .... G03B 2205/0046; G03B 5/00; G06T 7/70; H04N 5/23212
See application file for complete search history.

(56) References Cited

U.S. PATENT DOCUMENTS

2001/0053489 A1* 12/2001 Dirksen .............. G03F 7/70358
430/30
2005/0117148 A1* 6/2005 Dirksen ................ G03F 7/7085
356/124

\* cited by examiner

METHOD FOR DETERMINING A DEVIATION ON A DISPLACEMENT PATH OF AN OPTICAL ZOOM LENS AND METHOD FOR CORRECTION AND IMAGE RECORDING DEVICE

BACKGROUND OF THE INVENTION

The present invention initially relates to a method for determining a mechanical deviation on a displacement path of a zoom optical unit, in particular on a displacement path of a zoom optical unit of a microscope. Furthermore, the invention relates to a method for correcting a displacement error of an image recorded using an electronic image sensor, wherein the displacement error is caused by a mechanical deviation on a displacement path of a zoom optical unit. Further subject matter of the invention is formed by an electronic image recording apparatus for recording an image of an object. The electronic image recording apparatus preferably is an electronic microscope.

The prior art has disclosed zoom optical units whose focal length is changeable by way of a mechanical displacement of one or more lenses. As a rule, the mechanical displacement is implemented along a single translational direction, which lies along an optical axis of the zoom optical unit. By way of example, such zoom optical units find use in microscopes with an electronic image recording apparatus, where they are arranged on the optical axis between an objective lens of the microscope and an image sensor of the microscope.

By way of example, the mechanical displacement of the zoom optical unit is realized by a drive consisting of a motor, a transmission, a mechanical guide and sensors. The components to be displaced have one degree of freedom. The remaining five degrees without freedom, i.e., translations in two directions perpendicular to the movement direction and rotations in all three directions, are defined by the guide.

The mechanical guide has unavoidable guidance errors. These guidance errors comprise systematic guidance errors, such as a processing error, for example, and statistical guidance errors, which are caused by play and by elasticity and deformations on account of temperature changes, for example. The guidance errors lead to an image of an object to be recorded having a displacement error in an x-, y- and/or z-direction and/or a tilt error about an x- and/or y-axis. The systematic guidance errors and the statistical guidance errors can be reduced by structural means, for example by the use of highly accurate guidance elements or by force-fit connections for realizing freedom of play. However, these structural means are very complicated.

The prior art has disclosed the practice of correcting the displacement error of an image recorded by an image sensor by virtue of not using the entire area of the image sensor for representing an image for a user but instead using merely a section of this area with a defined size. Once the displacement error is known in the x- and y-directions, the section can be displaced accordingly. The systematic component of the displacement error can be ascertained in advance and corrected accordingly. However, the statistical component of the displacement error is random.

The prior art has disclosed microscopes with zoom optical units, such as, e.g., stereo microscopes, surgical microscopes, macroscopes and microscopes with an electronic image recording apparatus, in which the guidance error has been minimized with much outlay by appropriate structures or has been compensated using complicated components, such as image stabilization assemblies, for example. In part, this leads to the focal length of the zoom optical unit only being changeable at a low speed.

U.S. Pat. No. 8,860,827 B2 and DE 10 2014 223 957 A1 have disclosed the practice of correcting a guidance error by moving one or more additional optical elements.

EP 1 870 668 A1 discloses a detection of a guidance error with the aid of a sensor. To this end, a laser beam is directed through a zoom optical unit, whereupon said laser beam strikes the sensor. The guidance error is corrected by manipulating optical elements.

U.S. Pat. No. 8,237,821 B2 teaches a zoom optical unit and an image recording device, which is embodied to correct a distortion caused by a zoom optical unit. An image recorded by a camera sensor is used for this correction. However, this solution is not provided to correct statistical errors, which are caused by the movement of the zoom optical unit.

Proceeding from the prior art, the object of the present invention consists in being able to detect a mechanical deviation on a displacement path of a zoom optical unit with little outlay in order to be able to correct the resultant statistical error.

SUMMARY OF THE INVENTION

The specified object is achieved by a method as claimed in the attached claim 1. Furthermore, the object is achieved by methods as claimed in attached alternative independent claims 3 and 6 and by an electronic image recording apparatus as claimed in attached alternative independent claim 8.

A first one of the methods according to the invention serves to determine a mechanical deviation on a displacement path of a zoom optical unit. The zoom optical unit has a focal length that is modifiable by displacing one or more components of the zoom optical unit along an optical axis of the zoom optical unit. Consequently, this displacement is implemented along the displacement path lying along the optical axis. In the ideal case, the displacement only has one degree of freedom, which lies along the optical axis. However, in principle, there is the mechanical deviation to be determined, which leads to the component of the zoom optical unit to be displaced slightly leaving the displacement path during the displacement thereof. The mechanical deviation occurs laterally with respect to the movement direction of the zoom optical unit, i.e., laterally with respect to the displacement path of the zoom optical unit, and/or in the form of one or more tilts, the tilt axes of which are perpendicular to the movement direction. The component to be displaced of the zoom optical unit comprises one or more optical lenses. Moreover, the zoom optical unit comprises one or more optical lenses that are not displaceable.

The zoom optical unit is arranged in a beam path between an object to be recorded and an electronic image sensor. However, further optical lenses may also be arranged between the object to be recorded and the zoom optical unit and/or between the zoom optical unit and the electronic image sensor.

An optical marking is introduced or coupled into the beam path formed between the object to be recorded and the electronic image sensor in a step of the first method according to the invention. The optical marking is introduced at a position of the beam path that is situated between the object to be recorded and the zoom optical unit, as a result of which the optical marking passes the zoom optical unit and is subsequently imaged on an image. The beam path with the optical marking passes the zoom optical unit, whereupon an image of the object to be recorded but also the image of the optical marking are imaged, wherein the image of the object to be recorded and the image of the optical marking may form a unit or may be present separately. The image of the optical marking is preferably cast on the image sensor, particularly if the image of the object to be recorded and the image of the optical marking form a unit. Alternatively, the image of the optical marking is preferably cast on a marking sensor, particularly if the image of the object to be recorded and the image of the optical marking are present separately. The beam path is an imaging beam path for imaging the object. The object to be imaged is preferably a sample, in particular a sample to be examined by microscopy. The optical marking is introduced or coupled into the beam path in stationary fashion in relation to the beam path.

In a further step that is preferably carried out, the zoom optical unit is zoomed, for the purposes of which one or more components of the zoom optical unit are displaced along the displacement path, with this component slightly deviating from the displacement path during the displacement movement on account of the mechanical deviation. When the zoom optical unit is zoomed, the focal length thereof is modified. A magnification factor of the zoom optical unit is modified by zooming the zoom optical unit.

The optical marking is detected in the image of the optical marking in a further step of the first method according to the invention in order to determine the position of said optical marking in the image of the optical marking. In particular, the position is ascertained in a plane perpendicular to the optical axis. The position has two coordinates.

In a further step of the first method according to the invention, the previously determined position of the detected optical marking is compared with a reference position of the optical marking in order to determine the mechanical deviation on the displacement path of the zoom optical unit. The reference position of the optical marking is the position at which the optical marking is imaged if the mechanical deviation does not exist, i.e., equals zero.

Using the first method according to the invention, it is possible to determine both the systematic and the statistical mechanical deviation on the displacement path of the zoom optical unit.

An advantage of the first method according to the invention consists of the realization thereof, for example in a microscope, requiring no great outlay since it only requires a few additional hardware components and since it can be realized substantially by software or firmware, and so the production costs are not increased or only increased slightly.

The first method according to the invention is preferably used to determine the mechanical deviation on the displacement path of the zoom optical unit of a microscope. The microscope is preferably a microscope with an electronic image recording apparatus. Preferably, an objective lens is arranged in the beam path between the object to be recorded and the position of the beam path, situated between the object to be recorded and the zoom optical unit, at which the optical marking is introduced.

In preferred embodiments of the first method according to the invention, the optical marking is formed by light modified by an imageable mark. The imageable mark is preferably formed by a shaped stop such that the light modified by the imageable mark was shaped by the stop. Alternatively, the imageable mark is preferably formed by an optical structure such that the light modified by the imageable mark was shaped by the optical structure. The optical structure preferably has a reflecting or transmitting embodiment such that the light modified by the imageable mark was shaped by a reflection or a transmission at the imageable mark. The imageable mark is preferably arranged in a stationary intermediate image plane.

Alternatively, the optical marking is preferably formed by a single light beam. The light beam is preferably formed by a laser beam.

In preferred embodiments of the first method according to the invention, a partly transmissive splitter element is arranged at the position of the beam path that is situated between the object to be recorded and the zoom optical unit, the optical marking being introduced into the beam path at said position by way of said splitter element.

A second one of the methods according to the invention likewise serves to determine a mechanical deviation on a displacement path of a zoom optical unit. The zoom optical unit has a focal length that is modifiable by displacing one or more components of the zoom optical unit along an optical axis of the zoom optical unit. Consequently, this displacement is implemented along the displacement path lying along the optical axis. In the ideal case, the displacement only has one degree of freedom, which lies along the optical axis. However, in principle, there is the mechanical deviation to be determined, which leads to the component of the zoom optical unit to be displaced slightly leaving the displacement path during the displacement thereof. The mechanical deviation occurs laterally with respect to the movement direction of the zoom optical unit, i.e., laterally with respect to the displacement path of the zoom optical unit, and/or in the form of one or more tilts, the tilt axes of which are perpendicular to the movement direction. The component to be displaced of the zoom optical unit comprises one or more optical lenses. Moreover, the zoom optical unit comprises one or more optical lenses that are not displaceable.

The zoom optical unit is arranged in a beam path between an object to be recorded and an electronic image sensor. However, further optical lenses may also be arranged between the object to be recorded and the zoom optical unit and/or between the zoom optical unit and the electronic image sensor. The object to be imaged is preferably a sample, in particular a sample to be examined by microscopy.

A localizable region of the object to be imaged is selected in an image recorded by the image sensor in a step of the second method according to the invention. The localizable region represents a region of interest (ROI) or a point of interest (POI) and leads to identifiable imaging within the image recorded by the image sensor. The localizable region is preferably present in singular fashion on the object to be imaged such that it is uniquely identifiable in the image recorded by the image sensor. The localizable region preferably leads to high-contrast imaging within the image recorded by the image sensor such that it is reliably detectable.

In a further step, the zoom optical unit is zoomed, for the purposes of which one or more components of the zoom optical unit are displaced along the displacement path, with this component slightly deviating from the displacement path during the displacement movement on account of the mechanical deviation. When the zoom optical unit is zoomed, the focal length thereof is modified. A magnification factor of the zoom optical unit is modified by zooming the zoom optical unit. Zooming the zoom optical unit modifies not only the size of the localizable region but also a position of the localizable region in the image recorded by the image sensor.

According to the invention, there is continuous detection of the localizable region in the image recorded by the image sensor while zooming the zoom optical unit. Moreover, there is continuous determination of coordinates of the changing position of the localizable region in the image recorded by the image sensor while zooming the zoom optical unit. This process represents tracking of the localizable region.

In a further step, a displacement of the localizable region that occurred while zooming the zoom optical unit is determined, said displacement remaining after taking account of, i.e., eliminating, a displacement of the localizable region caused by the change in the magnification factor. This remaining displacement of the localizable region represents the mechanical deviation on the displacement path of the zoom optical unit. This comprises the systematic and statistical mechanical deviation on the displacement path of the zoom optical unit.

An advantage of the second method according to the invention consists of the realization thereof, for example in a microscope, requiring no great outlay since it can be realized by software or firmware, as a result of which the production costs are only increased slightly.

The displacement of the localizable region that occurred while zooming the zoom optical unit is determined proceeding from the previously ascertained coordinates of the changing position of the localizable region. Preferably, a displacement arising immediately from the previously ascertained coordinates of the changing position of the localizable region is determined first, from which the displacement of the localizable region caused by the change in the magnification factor is subtracted.

In preferred embodiments of the second method according to the invention, an invariant point of the zoom optical unit is determined in the image recorded by the image sensor in order to ascertain the displacement of the localizable region caused by the change in the magnification factor. The invariant point is that point in the image recorded by the image sensor which is not displaced in the image by the change in the magnification factor.

Two of the localizable regions of the object to be imaged are selected in the image recorded by the image sensor in preferred embodiments of the second method according to the invention. The two localizable regions are detected while zooming the zoom optical unit. The coordinates of the changing positions of the localizable regions are continuously determined in the image recorded by the image sensor while zooming the zoom optical unit. The changing magnification factor or the displacement of the localizable regions caused by the change in the magnification factor is taken into account on the basis of changing positions of the two localizable regions.

In a further preferred embodiment of the second method according to the invention, the object to be recorded is moved in defined fashion, for the purposes of which a sample carrier, for example, is used. The movement of the object to be recorded is taken into account when determining the displacement that occurred while zooming the zoom optical unit.

The second method according to the invention is preferably used to determine the mechanical deviation on the displacement path of the zoom optical unit of a microscope. The microscope is preferably a microscope with an electronic image recording apparatus. An objective lens is preferably arranged in the beam path between the object to be recorded and the zoom optical unit.

In addition to statistical errors, the errors ascertainable using the methods according to the invention for determining the mechanical deviation also comprise further errors, such as internally induced disturbances, for example thermal changes of components due to heat influx from internal components, e.g., from motors, guides, bearings, electronic components and illumination assemblies; and vibrations caused by internal components. The further errors also comprise externally induced disturbances, such as a thermal change in the components as a result of an external heat influx, e.g., from light sources, heaters, air conditioning, exhaust heat from surrounding machines, temperature change in rooms not subject to climate control, and ambient vibrations in the form of building vibrations, vibrations of surrounding machines or vibrations caused by surrounding persons.

A further subject matter of the invention is formed by the method for correcting a displacement error of an image recorded using an electronic image sensor. This method uses one of the methods according to the invention for determining a mechanical deviation on a displacement path of a zoom optical unit. The displacement error to be corrected is caused by a mechanical deviation on a displacement path of a zoom optical unit. Accordingly, the mechanical deviation on the displacement path of the zoom optical unit is determined first using one of the methods according to the invention for determining a mechanical deviation on a displacement path of a zoom optical unit such that, as a result, this mechanical deviation is known. Preferably, one of the described preferred embodiments of one of the methods according to the invention is applied for the purposes of determining the mechanical deviation. The mechanical deviation is preferably determined on an ongoing basis or continuously while the object to be recorded is recorded.

In a further step, a region of the image to be corrected is selected in accordance with the previously determined mechanical deviation in order to equalize the mechanical deviation. To this end, a certain region of the image sensor is preferably selected or a center of the image is displaced. This leads to an image content of the image to be corrected being displaced in accordance with the previously determined mechanical deviation such that the mechanical deviation is equalized. A region of the image to be corrected is preferably selected continuously or on an ongoing basis while the object to be recorded is recorded such that the output image is continuously corrected for an operator.

The method according to the invention for correcting the displacement error is preferably carried out continuously in order to correct, on an ongoing basis, the statistical component of the mechanical deviation, in particular, during a zoom process, i.e., during the displacement along the displacement path.

Incidentally, the method according to the invention for correcting a displacement error preferably also has features that are specified in conjunction with the methods according to the invention for determining a mechanical deviation and the preferred embodiments thereof.

The electronic image recording apparatus according to the invention serves to record an image of an object. The electronic image recording apparatus is preferably formed by a microscope, in particular by a microscope with an electronic image recording apparatus. The electronic image recording apparatus comprises an electronic image sensor for electronically converting the image to be recorded. Furthermore, the electronic image recording apparatus comprises a zoom optical unit, which is arranged in a beam path between the object to be recorded and the electronic image sensor. The electronic image recording apparatus may have further optical components in the beam path between the object to be recorded and the electronic image sensor. At least one component of the zoom optical unit is displaceable along a displacement path. However, the zoom optical unit has, as a matter of principle, a mechanical deviation on this displacement path such that the component to be displaced is not displaceable in ideal fashion along the displacement path but instead deviates from the displacement path as a consequence of the mechanical deviation, wherein this deviation may have systematic and/or statistical components.

The electronic image recording apparatus furthermore comprises a marking means for introducing an optical marking into the beam path at a position of the beam path that is situated between the object to be recorded and the zoom optical unit. The optical marking that is introducible by means of the marking means passes the zoom optical unit in order subsequently to be imaged in an image. The beam path with the optical marking passes the zoom optical unit, whereupon an image of the object to be recorded, but also the image of the optical marking, are imaged.

A particular advantage of the electronic image recording apparatus according to the invention consists in it allowing a determination of the mechanical deviation on the displacement path of the zoom optical unit with little outlay, for the purposes of which it is preferably embodied to carry out one of the methods according to the invention for determining a mechanical deviation on the displacement path of a zoom optical unit.

The electronic image recording apparatus preferably comprises an image processing unit for digital processing of images. The image processing unit is embodied to carry out one of the methods according to the invention for determining a mechanical deviation on the displacement path of a zoom optical unit. Particularly preferably, the image processing unit is embodied to carry out the method according to the invention for correcting a displacement error of an image recorded using an electronic image sensor. Consequently, the displacement caused by the mechanical deviation of the zoom optical unit can be corrected in the images recorded by the image sensor. Incidentally, the electronic image recording apparatus preferably also has features which are specified in conjunction with the methods according to the invention and the preferred embodiments thereof.

The marking means preferably comprises an imageable mark. The imageable mark is preferably non-transparent or partly transparent. The imageable mark is preferably embodied on a transparent plate. Alternatively preferably, the imageable mark is formed by a stop. The imageable mark has an optically detectable shape. Therefore, the imageable mark preferably has the shape of a wedge. The imageable mark alternatively preferably has a reflecting embodiment. The imageable mark is preferably arranged in a stationary intermediate image plane of the beam path of the electronic image recording apparatus.

The marking means preferably comprises a partly transmissive splitter element, which is arranged at the position of the beam path situated between the object to be recorded and the zoom optical unit. Consequently, the optical marking is introducible or coupleable into the beam path of the electronic image recording apparatus with the aid of the partly transmissive splitter element. The partly transmissive splitter element is embodied to allow the beam path extending from the object to be recorded to the image sensor to pass and to couple a beam path of the optical marking into the beam path extending from the object to be recorded to the image sensor. The partly transmissive splitter element is preferably formed by a coated splitter plate, by a splitter prism or by a partly transmissive mirror. The partly transmissive splitter element is arranged at that position of the beam path situated between the object to be recorded and the zoom optical unit at which the optical marking is introduced or coupled into the beam path. In principle, the partly transmissive splitter element is not mandatory since the imageable mark may also be arranged directly in the detection beam path.

The marking means preferably comprises a light source for emitting a light beam that forms the optical marking. Furthermore, the marking means preferably comprises the partly transmissive splitter element, by means of which the light beam that forms the optical marking is introducible or coupleable into the beam path extending from the object to be recorded to the image sensor. The light of the light source preferably has a wavelength outside of the visible light.

The light source is preferably formed by a laser light source.

The electrical image recording apparatus preferably furthermore comprises a marking sensor for receiving the light that has passed through the zoom optical unit and that includes the optical marking. The marking sensor has a local sensitivity such that the light striking the marking sensor is localizable.

In a first preferred embodiment of the electronic image recording apparatus according to the invention, the latter comprises a reflected light illumination source for reflected light illumination of the object to be recorded. Light of the reflected light illumination source is coupleable into the beam path extending from the object to be recorded to the image sensor in the direction of the object to be recorded. Moreover, light of the reflected light illumination source is directed to the imageable mark such that this light is modified by the imageable mark; in particular, said light is shaped by the imageable mark. The light modified by the imageable mark is preferably introducible or coupleable into the beam path of the electronic image recording apparatus by way of the partly transmissive splitter element such that said light is finally directed to the image sensor. To this end, the imageable mark is situated in a beam path between the reflected light illumination source and the partly transmissive splitter element.

In a second preferred embodiment of the electronic image recording apparatus according to the invention, the latter once again comprises a reflected light illumination source for reflected light illumination of the object to be recorded. Light of the reflected light illumination source is coupleable into the beam path extending from the object to be recorded to the image sensor in the direction of the object to be recorded. To this end, the reflected light illumination source is directed to the partly transmissive splitter element. The light passing the partly transmissive splitter element is directed to the imageable mark such that this light is modified by the imageable mark, wherein this light is directed back to the partly transmissive splitter element with the aid of a mirror. To this end, the imageable mark is situated in a beam path between the partly transmissive splitter element and the mirror. The mirror is arranged on a side of the partly transmissive splitter element lying opposite the reflected light illumination source. The light modified by the imageable mark is introducible or coupleable into the beam path of the electronic image recording apparatus by way of the partly transmissive splitter element such that said light is finally directed to the image sensor.

In a third preferred embodiment of the electronic image recording apparatus according to the invention, the marking means comprises a laser light source. A laser beam producible by the laser light source forms the optical marking. The laser light source preferably comprises an imaging optical unit. The laser light source is preferably embodied to emit non-visible light. The laser beam is introducible or coupleable into the beam path of the electronic image recording apparatus by way of the partly transmissive splitter element such that said light is finally directed to the image sensor.

In a fourth preferred embodiment of the electronic image recording apparatus according to the invention, the marking means once again comprises a laser light source. A laser beam producible by the laser light source forms the optical marking. The laser light source preferably comprises an imaging optical unit. The laser light source is preferably embodied to emit non-visible light. The laser beam is introducible or coupleable into the beam path of the electronic image recording apparatus by way of the partly transmissive splitter element. The image recording apparatus furthermore comprises the marking sensor for receiving the laser beam that has passed through the zoom optical unit. Furthermore, the image recording apparatus comprises a further partly transmissive splitter element, which is arranged in the beam path between the zoom optical unit and the image sensor and which is embodied to output couple the laser beam. The output coupled laser beam is directed on the marking sensor.

In a fifth preferred embodiment of the electronic image recording apparatus according to the invention, the imageable mark is preferably arranged in an input pupil in relation to the beam path of the zoom optical unit in such a way that it is imageable on the image sensor or on the marking sensor by unsharp imaging, wherein the image sensor or the marking sensor is embodied for detecting a phase of the incident light. The phase of the light converted by the image sensor or by the marking sensor is proportional to the mechanical deviation, as a result of which the latter is rendered determinable by measuring the phase. The marking sensor is preferably formed by a Bertrand system.

In a sixth preferred embodiment of the electronic image recording apparatus according to the invention, the imageable mark has a periodic structure such that the optical marking is formed by a periodic pattern. The imageable mark is arranged between a marking light source and the partly transmissive splitter element. Light of the marking light source is directed to the imageable mark such that this light is shaped by the imageable mark and obtains the periodic pattern. The light shaped by the imageable mark is preferably introducible or coupleable into the beam path of the electronic image recording apparatus by way of the partly transmissive splitter element such that said light is finally directed to the image sensor. The periodic pattern forming the optical marking leads to an oscillation in the spatial domain, which can easily be localized. The periodic structure is preferably formed by pinholes arranged in matrix-like fashion such that the optical marking is formed by light beams arranged in matrix-like fashion.

A seventh preferred embodiment of the electronic image recording apparatus represents a development of the first preferred embodiment. The marking means comprises a switchable stop which forms the imageable mark. The switchable stop comprises a multiplicity of individual elements arranged within an area, said individual elements being individually switchable from a transparent state into a non-transparent state, and vice versa. The switchable stop is preferably formed by an LCD shutter. The electronic image recording apparatus preferably comprises two mirrors, aligned perpendicular to one another, for guiding the light of the reflected light source through the switchable stop.

An eighth preferred embodiment of the electronic image recording apparatus represents a further development of the first preferred embodiment. The marking means comprises a switchable micromirror apparatus which forms the imageable mark. The micromirror apparatus comprises a multiplicity of individual mirrors arranged within an area, said individual mirrors being individually tiltable. The micromirror apparatus is preferably formed by a digital micromirror device or by a microelectromechanical system. The light of the reflected light illumination source is directable on the partly transmissive splitter element, from where it is directable on the micromirror apparatus, the latter rendering said light directable back on the partly transmissive splitter element. To this end, the micromirror apparatus is situated next to the beam path extending between the reflected light illumination source and the partly transmissive splitter element.

BRIEF DESCRIPTION OF THE DRAWINGS

Further details and developments of the invention will become apparent from the following description of preferred embodiments of the invention, with reference being made to the drawing. In the figures.

DETAILED DESCRIPTION OF THE INVENTION

Figure 1:
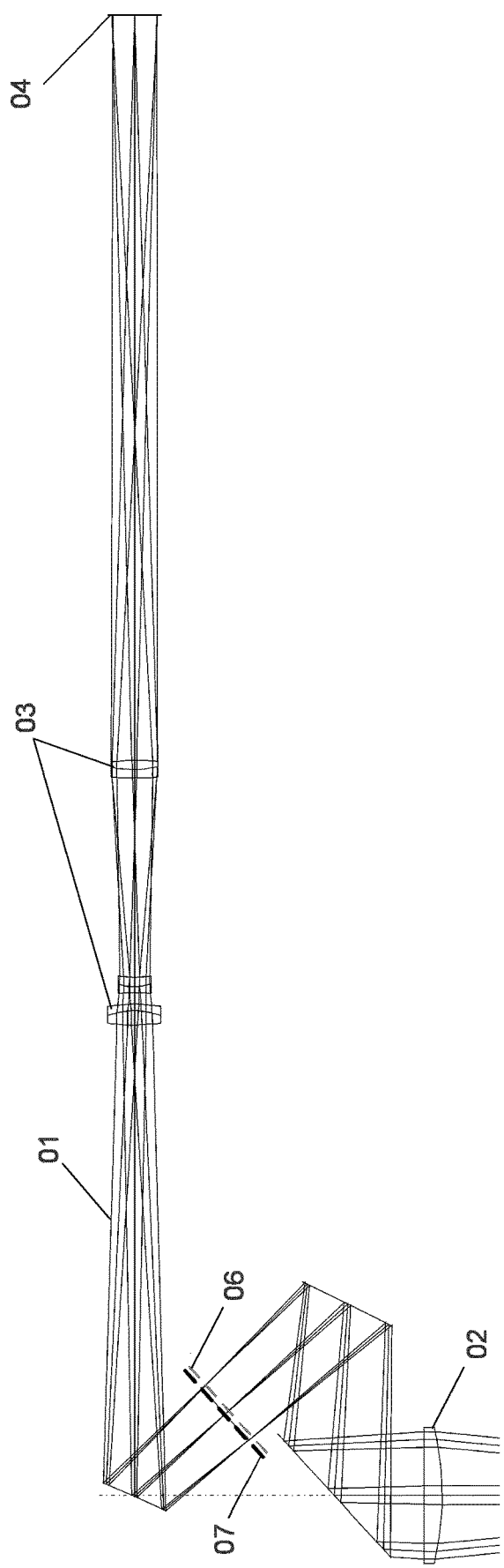
FIG. 1: shows an imaging beam path in a preferred embodiment of an image recording apparatus according to the invention.

FIG. 1 shows an imaging beam path 01 in a preferred embodiment of an image recording apparatus according to the invention. In particular, the image recording apparatus is a microscope with an electronic image recording apparatus, of which an objective lens or tube lens 02, a zoom optical unit 03 and an image sensor 04 are illustrated. An imageable mark 07 is arranged in a stationary intermediate image plane 06 of the imaging beam path 01. The imageable mark 07 can be embodied as a plane parallel plate with a mark attached or a corresponding stop, which has the structure of the mark. The nature of the imageable mark 07 is such that, depending on a selected level of the zoom optical unit 03, the region to be resolved by the image sensor 04 lies outside of an image section (not shown) provided for an operator. Since the image region in the intermediate image plane 06 becomes smaller when zooming the zoom optical unit 03, the imageable mark 07 is preferably embodied as a wedge or as a triangle (shown in FIG. 2 and FIG. 3) such that the widest point of the wedge or of the triangle can just still be resolved at an edge of the image region.

The illustrated beam path 01 is produced to determine a mechanical deviation on a displacement path of the zoom optical unit 03 according to a preferred embodiment of a method according to the invention.

Figure 2:
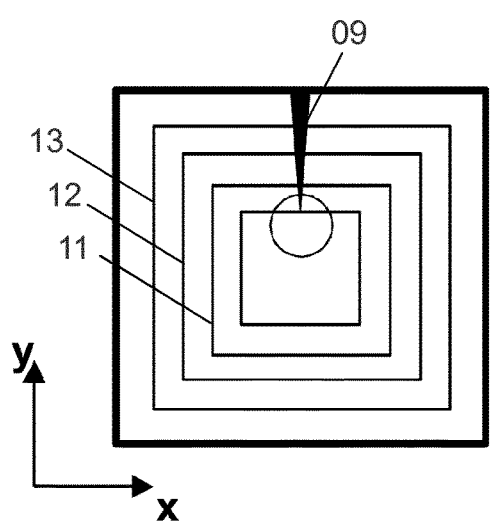
FIG. 2: shows an image of an imageable mark as shown in FIG. 1, in the case of different image field dimensions.

FIG. 2 shows an image 09 of the imageable mark 07, shown in FIG. 1, in the form of a wedge in the case of image fields of different sizes. A first image field 11, a second image field 12 and a third image field 13 have different sizes and lead to different sizes of the image 09 of the imageable mark (shown in FIG. 1).

Figure 3:
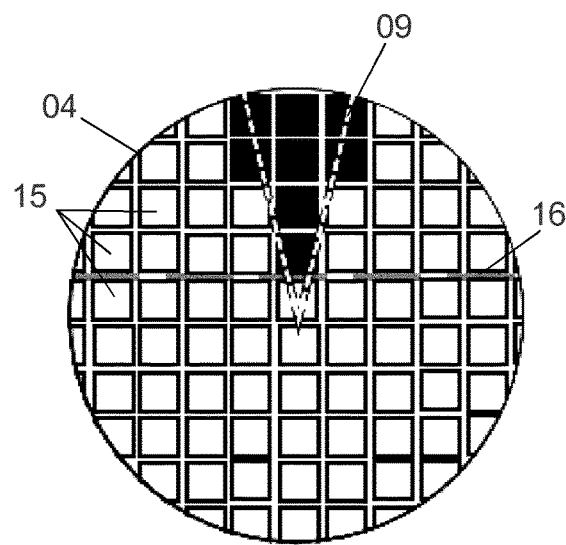
FIG. 3: shows the image illustrated in FIG. 2 on an image sensor shown in FIG. 1.

FIG. 3 shows the image 09, illustrated in FIG. 2, on the image sensor 04. The image sensor 04 comprises a multiplicity of pixels 15, wherein only the pixels 15 below an image field edge 16 record a visible image for the operator. The image 09 of the imageable mark 07 (shown in FIG. 1) can be removed by calculation by way of an interpolation of the surrounding pixels 15 such that the operator cannot perceive the image 09 of the imageable mark 07 (shown in FIG. 1). If the imageable mark 07 (shown in FIG. 1) is applied to a plane parallel plate, care should be taken that appropriate cleanliness values are observed. Contaminations and artifacts are imaged in focus on account of their position in the intermediate image and may influence the image even in the case of unsharp imaging. Preferably, the images of the contaminations and artifacts are removed by calculation by way of a calibration with a reference image.

Figure 4:
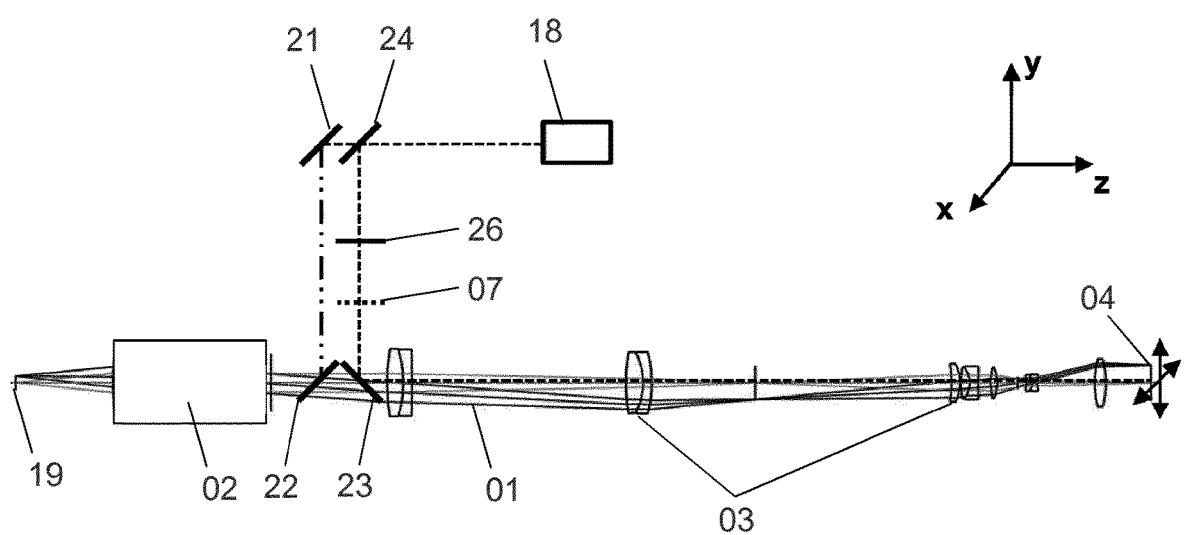
FIG. 4: shows a first preferred embodiment of the image recording apparatus according to the invention.

FIG. 4 shows a first preferred embodiment of the image recording apparatus according to the invention, in the form of a microscope with an electronic image recording apparatus. Like the embodiment shown in FIG. 1, the microscope comprises the objective lens or the tube lens 02, the zoom optical unit 03 in the imaging beam path 01, the image sensor 04 and the imageable mark 07. The microscope furthermore comprises a reflected light illumination source 18 for reflected light illumination of an object 19 to be recorded, light of the reflected light illumination source 18 being coupled into the imaging beam path 01 via a reflected light mirror 21 and a partly transmissive reflected light splitter element 22. Moreover, light from the reflected light illumination source 18 is coupled into the imaging beam path 01 via a first partly transmissive splitter element 23 after said light has passed through a second partly transmissive splitter element 24, an optical unit 26 for creating an intermediate image plane and the imageable mark 07. The optical unit 26 for creating an intermediate image plane preferably comprises a filter (not illustrated) for reducing a beam intensity.

Figure 5:
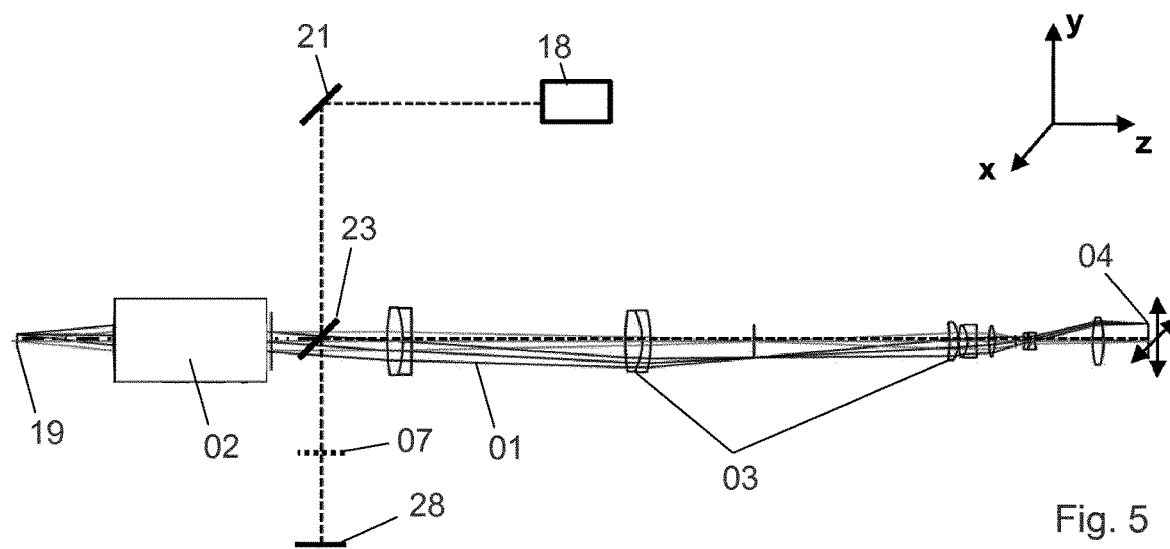
FIG. 5: shows a second preferred embodiment of the image recording apparatus according to the invention.

FIG. 5 shows a second preferred embodiment of the image recording apparatus according to the invention, which initially resembles the embodiment shown in FIG. 4. In contrast to the embodiment shown in FIG. 4, the light of the reflected light illumination source 18 is directed via the reflected light mirror 21 on the first partly transmissive splitter element 23, from where it partly is coupled into the imaging beam path 01 as reflected light and partly reaches a mirror 28. An optical unit 26 (shown in FIG. 4) for creating an intermediate image plane is preferably arranged on the mirror 28. The imageable mark 07 is situated in the intermediate image plane between the first partly transmissive splitter element 23 and the mirror 28. Alternatively preferably, the mirror 28 is arranged in the intermediate image plane and the imageable mark 07 is embodied as a coating on the mirror 28, for example.

Figure 6:
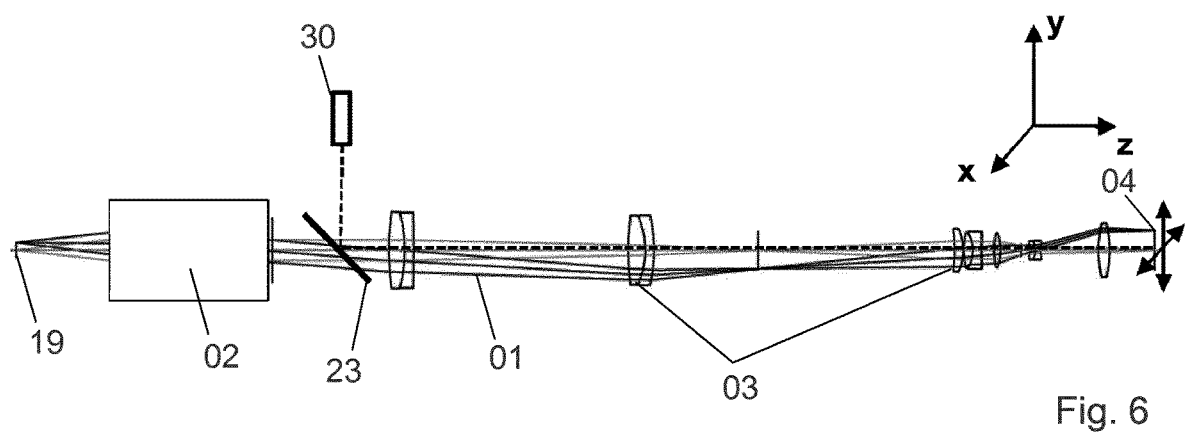
FIG. 6: shows a third preferred embodiment of the image recording apparatus according to the invention.

FIG. 6 shows a third preferred embodiment of the image recording apparatus according to the invention, in the form of a microscope with an electronic image recording apparatus. Like the embodiment shown in FIG. 4, the microscope comprises the objective lens or the tube lens 02, the zoom optical unit 03, the image sensor 04, the imageable mark 07 and the first partly transmissive splitter element 23 in the imaging beam path 01. Furthermore, the microscope comprises a laser diode 30 which is directed on the first partly transmissive splitter element 23 such that a laser beam of the laser diode 30 reaches the image sensor 04 through the zoom optical unit 03.

Figure 7:
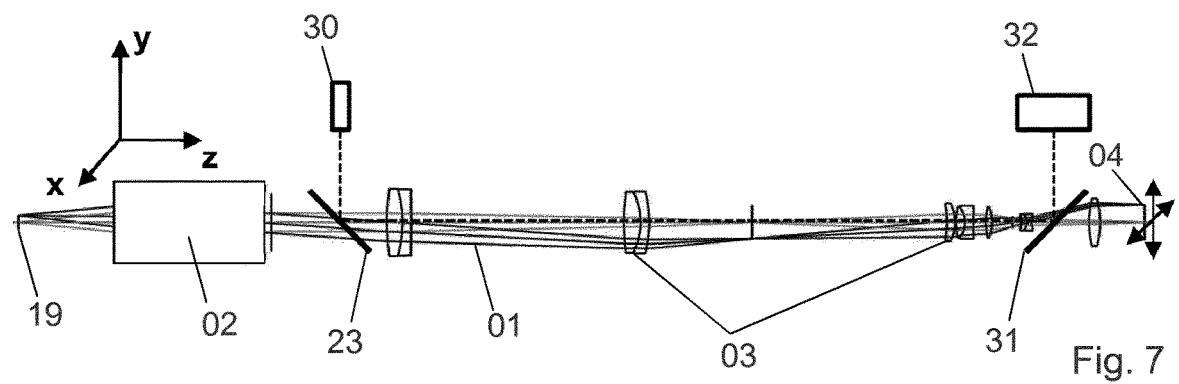
FIG. 7: shows a fourth preferred embodiment of the image recording apparatus according to the invention.

FIG. 7 shows a fourth preferred embodiment of the image recording apparatus according to the invention, which initially resembles the embodiment shown in FIG. 6. In contrast to the embodiment shown in FIG. 6, a marking sensor 32 serves to receive the beam of the laser diode 30 that has passed through the zoom optical unit 03. To this end, the image recording apparatus comprises a third partly transmissive splitter element 31 for output coupling onto the marking sensor 32 the beam of the laser diode 30 which has passed through the zoom optical unit 03. In this embodiment, the wavelength of the light of the laser diode 30 lies outside of the wavelength range that can be detected by the image sensor 04. Consequently, the beam of the laser diode 30 is not visible to the operator. The marking sensor 32 is preferably formed by a camera sensor or a spectral sensor and it detects a shift of the beam of the laser diode 30 when adjusting the zoom optical unit 03. From this, the necessary displacement of the image region of the image sensor 04 displayed to the operator is calculated. By way of example, the image sensor 04 detects in a wavelength range between 325 nm and 1000 nm while the laser diode 30 produces light at a wavelength of 980 nm, for example. The marking sensor 32, which is sensitive in a wavelength range from 400 nm to 1000 nm, for example, can detect this light of the laser diode 30. The wavelength range up to 980 nm preferably removed by a filter (not shown) upstream of the marking sensor 32. Preferably, a further filter is arranged upstream of the image sensor 04, said filter absorbing light with a wavelength above 950 nm.

Figure 8:
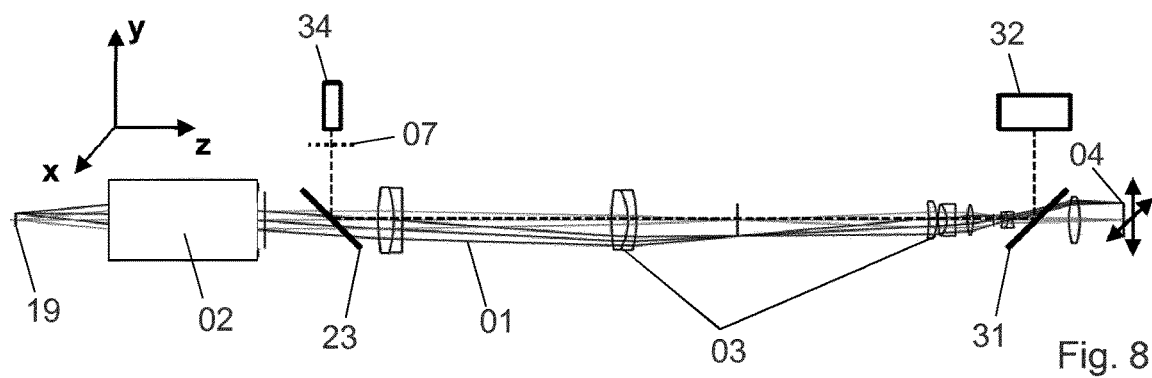
FIG. 8: shows a fifth preferred embodiment of the image recording apparatus according to the invention.

FIG. 8 shows a fifth preferred embodiment of the image recording apparatus according to the invention, which initially resembles the embodiment shown in FIG. 7. In contrast to the embodiment shown in FIG. 7, the image recording apparatus comprises a marking light source 34 instead of the laser diode, said marking light source being directed on the imageable mark 07 in the form of a periodic structure. The imageable mark 07 is situated in an input pupil and leads to a pupil manipulation which introduces a fixed point into the imaging beam path 01, the displacement of which is detectable. The marking sensor 32 is embodied to determine a phase of the brightness of the light incident thereon. The marking sensor 32 is preferably formed by a Bertrand system, by means of which the intensity of the pupil function can also be ascertained in addition to the intensity of the image. The phase is preferably determined from these two information items using the Gerchberg-Saxton algorithm. Likewise, use can be made of the phase-lift algorithm or the Wirtinger-Flow algorithm, for example. To this end, the marking light source 34 is embodied to produce coherent monochromatic light. Alternatively, the phase can be back-calculated by way of a digital phase gradient with angle-selective partially coherent illumination. Should the image sensor 04 be embodied to detect the phase, it can be used as an alternative to the marking sensor 32. In principle, the phase can be detected by applying the Fourier transform. The measured phase is a measure for the displacement. The imageable mark 07 is not imaged optically in focus and consequently not visible to the operator. A further alternative consists of recording a defocus stack (not shown) and determining the phase by way of the transport of intensity equation (TIE). This likewise requires coherent light and displaceability of the image sensor 04 in the z-direction. The path of the displacement of the image sensor 04 in the z-direction is sufficiently large to bring about defocusing.

Figure 9:
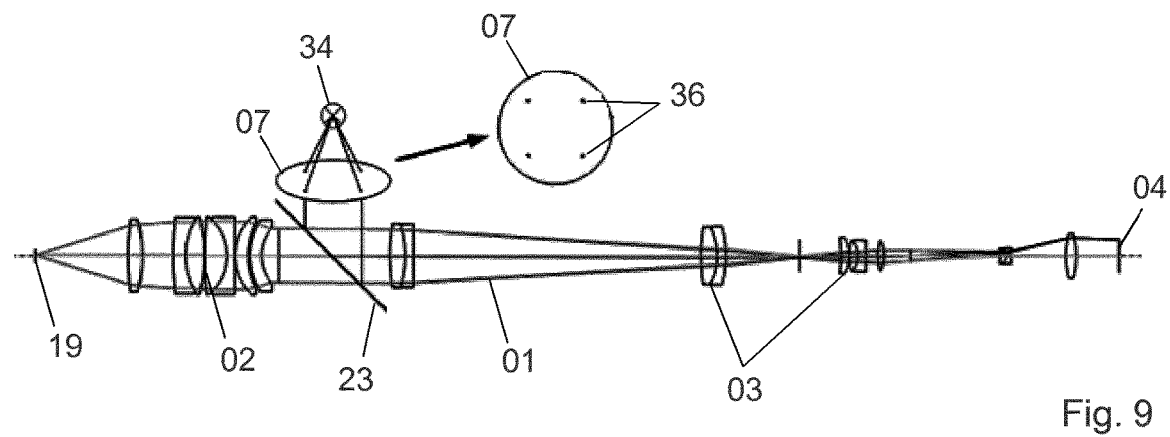
FIG. 9: shows a sixth preferred embodiment of the image recording apparatus according to the invention.

FIG. 9 shows a sixth preferred embodiment of the image recording apparatus according to the invention, which initially resembles the embodiment shown in FIG. 7. In contrast to the embodiment shown in FIG. 7, the image recording apparatus comprises the marking light source 34 instead of the laser diode, said marking light source being directed on the imageable mark 07 in the form of a perforated stop provided with four pinholes 36. The four pinholes 36 have a regular arrangement and lead to a simple oscillation on the image sensor 04. This oscillation can easily be localized and is accordingly removed by calculation from the image of the image sensor 04. The light produced by the marking light source 34 and the imageable mark 07 with the four pinholes 36 is coherent.

Figure 10:
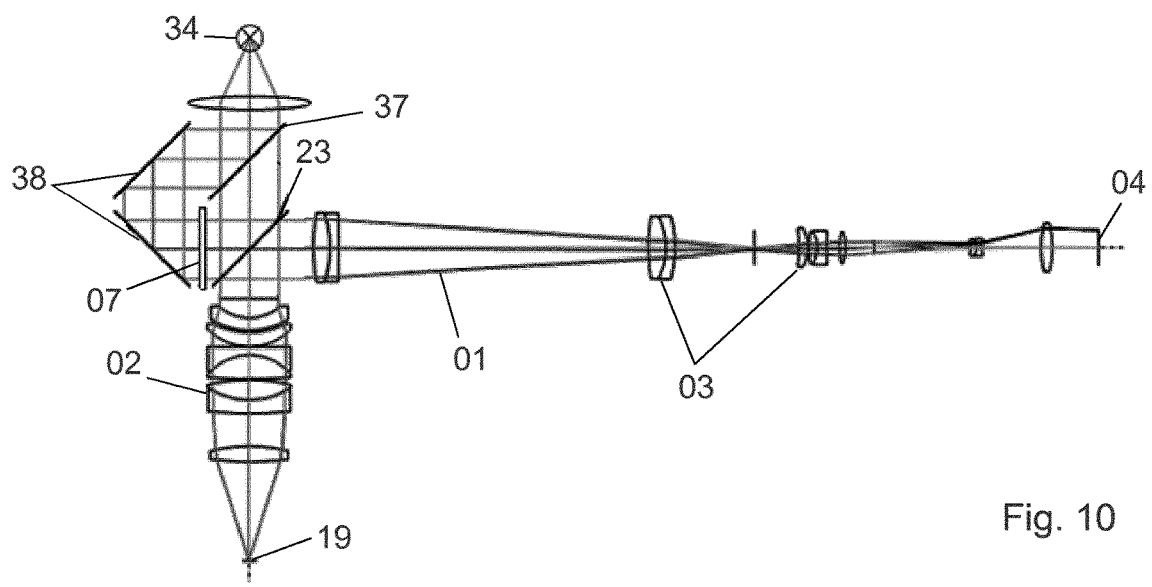
FIG. 10: shows a seventh preferred embodiment of the image recording apparatus according to the invention.

FIG. 10 shows a seventh preferred embodiment of the image recording apparatus according to the invention, which initially resembles the embodiment shown in FIG. 9. In contrast to the embodiment shown in FIG. 9, the imageable mark 07 is formed by a switchable LCD shutter. The light of the marking light source 34 reaches the imageable mark 07 formed by the LCD shutter via a fourth partly transmissive splitter element 37 and two mirrors 38 that are arranged perpendicular to one another.

Figure 11:
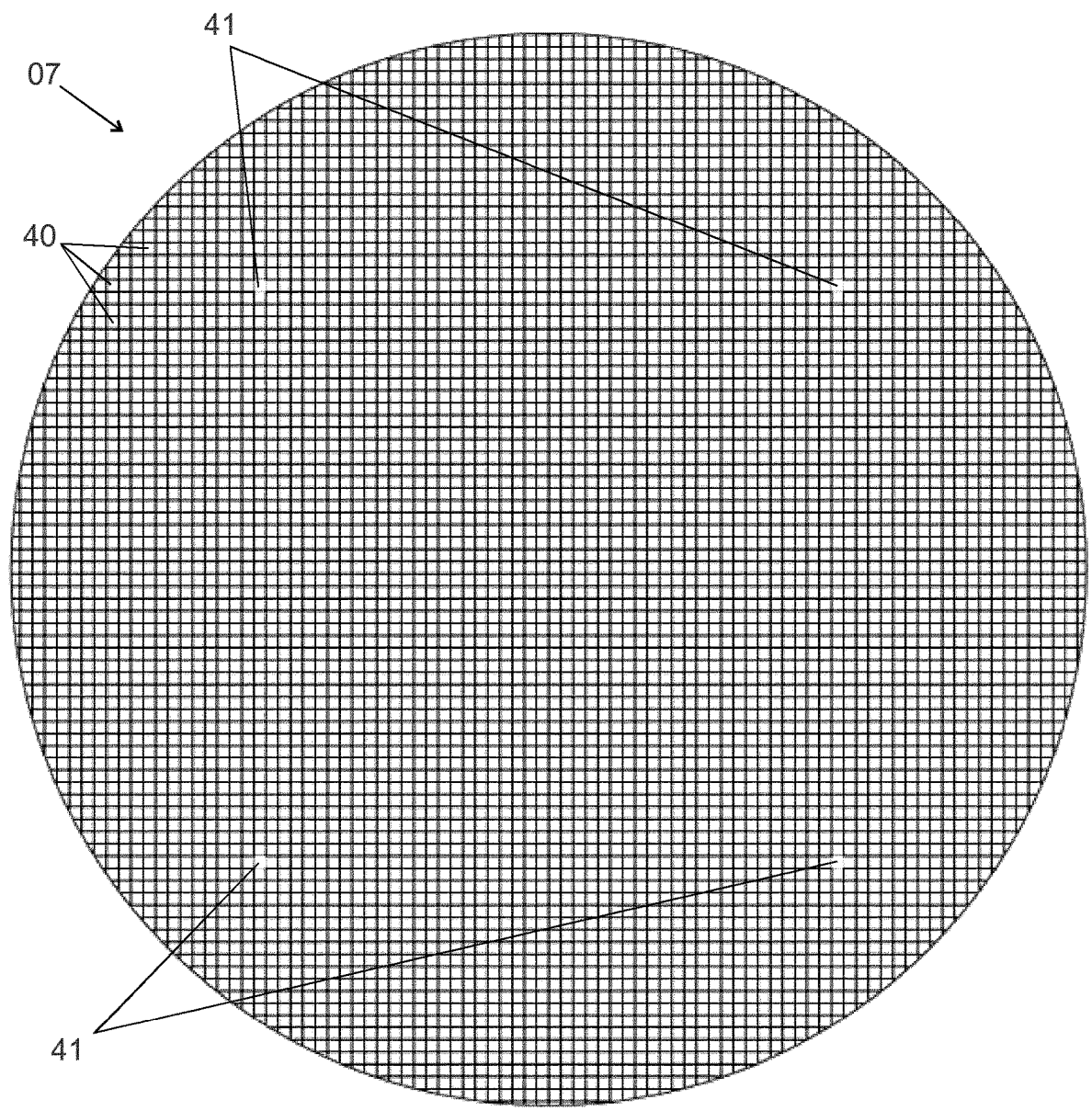
FIG. 11: shows, in detail, an imageable mark shown in FIG. 10.

FIG. 11 shows the imageable mark 07 in the form of the LCD shutter, shown in FIG. 10, in detail. The imageable mark 07 in the form of the LCD shutter comprises a multiplicity of switchable elements 40. Switching an individual one of the switchable elements 40 leads to a pinhole 41. Preferably, the switchable elements 40 are switched individually in a regular pattern such that, for example, four of the pinholes 41 are provided in a matrix-shaped arrangement, leading to the same effect as the imageable mark 07, shown in FIG. 9, in the form of the perforated stop with the four pinholes 36. If there is a change in the zoom of the zoom optical unit 03 (shown in FIG. 10), four different switchable elements 40 can be switched, these elements having a distance from one another that deviates from that of the shown example.

Figure 12:
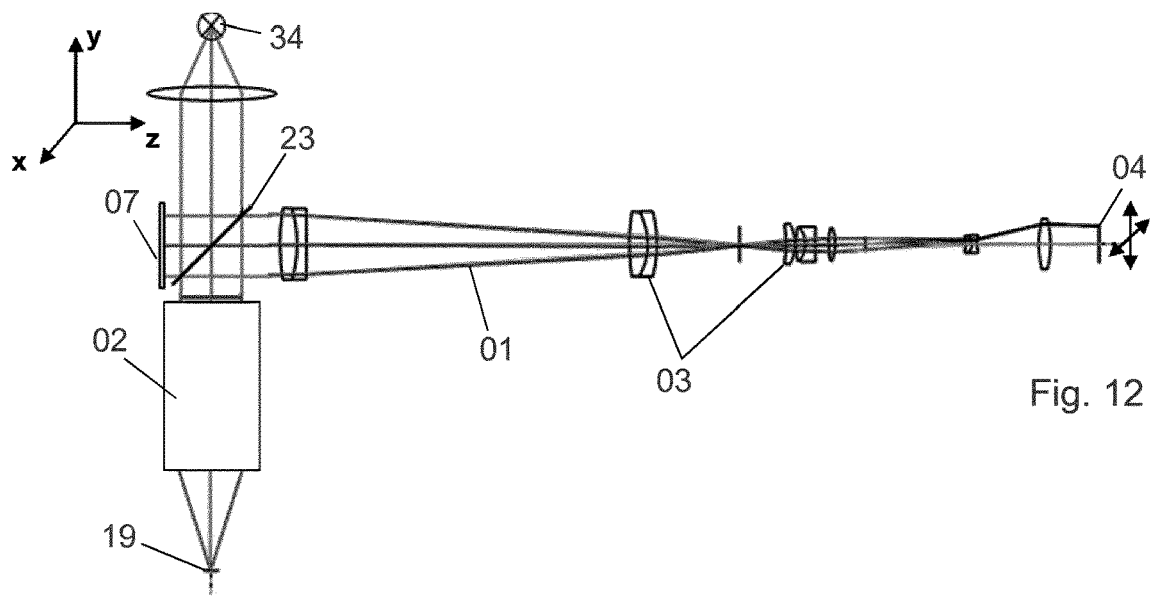
FIG. 12: shows an eighth preferred embodiment of the image recording apparatus according to the invention.

FIG. 12 shows an eighth preferred embodiment of the image recording apparatus according to the invention, which initially resembles the embodiment shown in FIG. 9. In contrast to the embodiment shown in FIG. 9, the imageable mark 07 is formed by a digital micromirror device, which is illuminated by the marking light source 34 via the partly transmissive splitter element 23 and which reflects back into the imaging beam path 01. The imageable mark 07 formed by the digital micromirror device can be switched, for example like the imageable mark 07 in the form of the LCD shutter shown in FIG. 11, and so four light beams with coherent light in each case are directed into the zoom optical unit 03.

In order to ascertain the displacement on the image sensor 04, the distortion and the displacement of the pixels in the image of the image sensor 04 on account of the change in magnification by zooming the zoom optical unit 03 are initially removed by calculation. The Fourier transform is formed of each image recorded by the image sensor 04, said image containing the image of the object 19 to be recorded and the superimposed oscillation of the structure of the imageable mark 07. The frequencies of the oscillation are clearly identifiable in this Fourier transform. In frequency space, these frequencies have the coordinate $\xi_i$, $\eta_i$. If the recorded image is displaced in relation to the original image, there is a change in the phase $\varphi$ of the oscillation but the coordinate of the frequency does not change. Consequently, the phase $\varphi$ can be uniquely ascertained in each recorded image. The phase $\varphi$ emerges from a real and imaginary part of the Fourier transform, which span a vector on a unit circle, at these points:

$$FT\{f(x-\Delta_{2x}, y-\Delta_{2y})\} = e^{-2\pi i \Delta_{2x}\xi} \cdot e^{-2\pi i \Delta_{2y}\eta} \cdot F\{\xi, \eta\}$$

In frequency space, the displacement on the image sensor 04 is defined by $FT\{f(x-\Delta_{2x}, y-\Delta_{2y})\}$. The exponential terms define the phase. In order to obtain the displacement vector $$\begin{pmatrix} \Delta_{2x} \\ \Delta_{2y} \end{pmatrix},$$

the quotient of the live Fourier coefficient $e^{-2\pi i \Delta_{2x}\xi} \cdot e^{-2\pi i \Delta_{2y}\eta} \cdot F\{\xi, \eta\}$ and the respective Fourier coefficient $F\{\xi_i, \eta_i\}$, $i=1,2$ is formed at two different points in the frequency space $(\xi_1, \eta_1)$ and $(\xi_2, \eta_2)$, and the phases $\varphi_1$ and $\varphi_2$ are determined. The Fourier coefficients $F\{\xi_i, \eta_i\}$, $i=1,2$ are therefore known because they belong to two frequency coordinates $(\xi_i, \eta_i)$, $i=1,2$ of the at least two superimposed base frequencies, which form the superimposed oscillation. Consequently, a linear system of equations arises for the displacement:

$$\begin{pmatrix} \varphi_1 \\ \varphi_2 \end{pmatrix} = \begin{pmatrix} \xi_1 & \eta_1 \\ \xi_2 & \eta_2 \end{pmatrix} \cdot \begin{pmatrix} \Delta_{2x} \\ \Delta_{2y} \end{pmatrix}$$

with the phase angles $\varphi_1$ and $\varphi_2$, and the frequency coordinates $(\xi_1, \eta_1)$, $i=1,2$.

The displacement $$\begin{pmatrix} \Delta_{2x} \\ \Delta_{2y} \end{pmatrix}$$

arises by solving this system of equations. In order to obtain the correct value for the displacement, the frequency of the structure of the imageable mark 07 is chosen in such a way that a period is always greater than the maximum displacement of the images on the image sensor 04. By way of example, the distances in the structure of the imageable mark 07 should be modified accordingly. Moreover, the frequencies of the superimposed oscillation and the amplitude thereof should be adapted in such a way that they are disjoint to the typical spectrum of the actual image information. The image of the structure of the imageable mark 07 is subtracted from the image recorded by the image sensor 04 in a further step and the latter is displaced counter to the ascertained displacement such that the corrected image of the object 19 is displayed to the operator.

Figure 13:
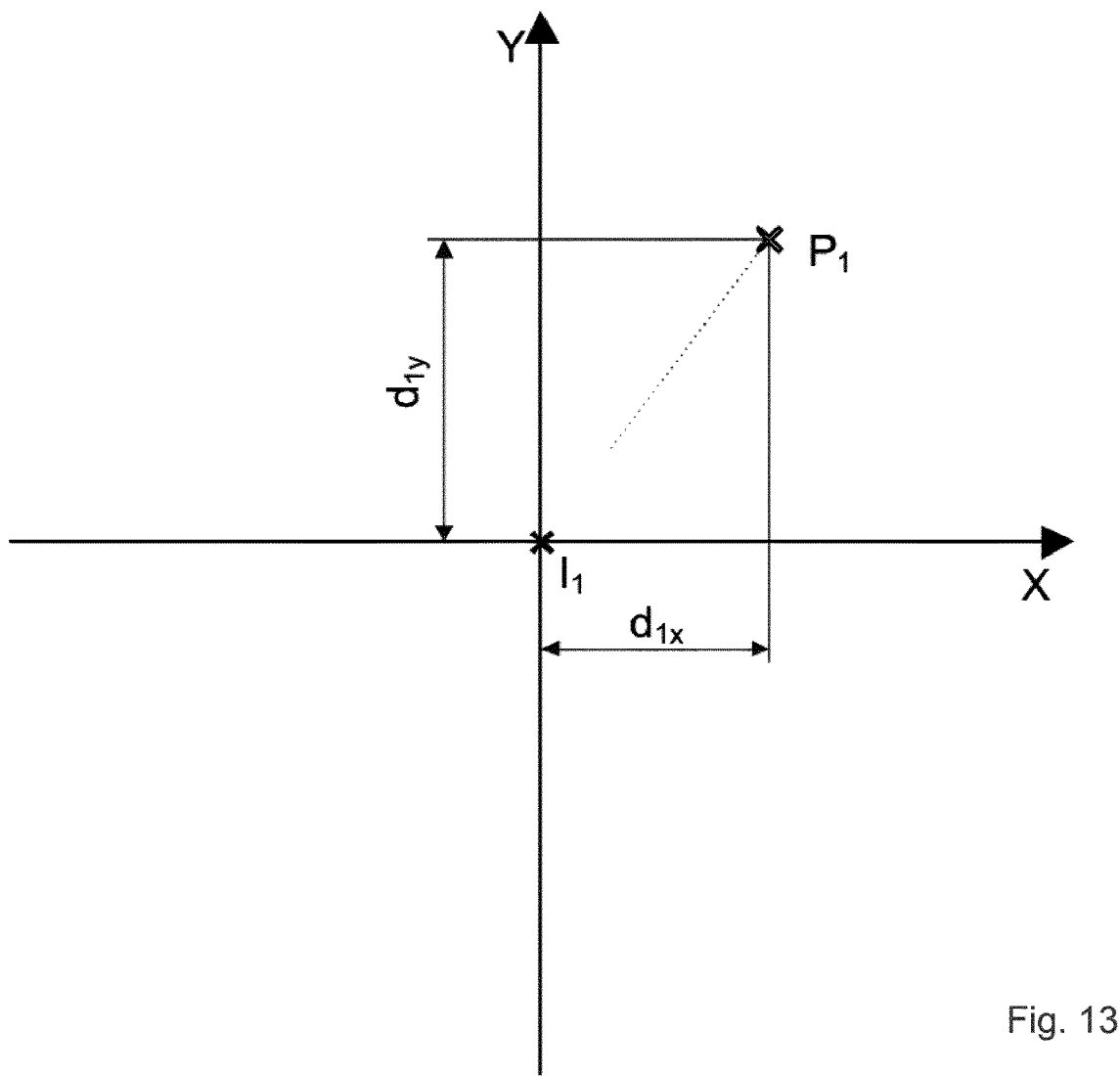
FIG. 13: shows a visualization of a first image recorded according to a first preferred embodiment of a method according to the invention.

FIG. 13 visualizes a first image recorded according to a first preferred embodiment of a method according to the invention. This first image was recorded with the aid of a microscope (not shown) equipped with a zoom optical unit. When zooming with the zoom optical unit, the magnification factor thereof changes. The zoom optical unit has a mechanical deviation on its displacement path. The image is recorded by an electronic image sensor. In the image a point of interest (POI) of a recorded object is localized at a point $P_1$, the latter being ascertained using methods of image recognition. Under the assumption that the magnification factor of the zoom optical unit is known continuously while zooming the zoom optical unit, this only one POI is enough to carry out the method according to the invention for determining or for correcting the mechanical deviation of the zoom optical unit. An invariant point $I_1$ of the zoom optical unit is placed, as per definition and preceding calibration, into an image center of the first image.

Figure 14:
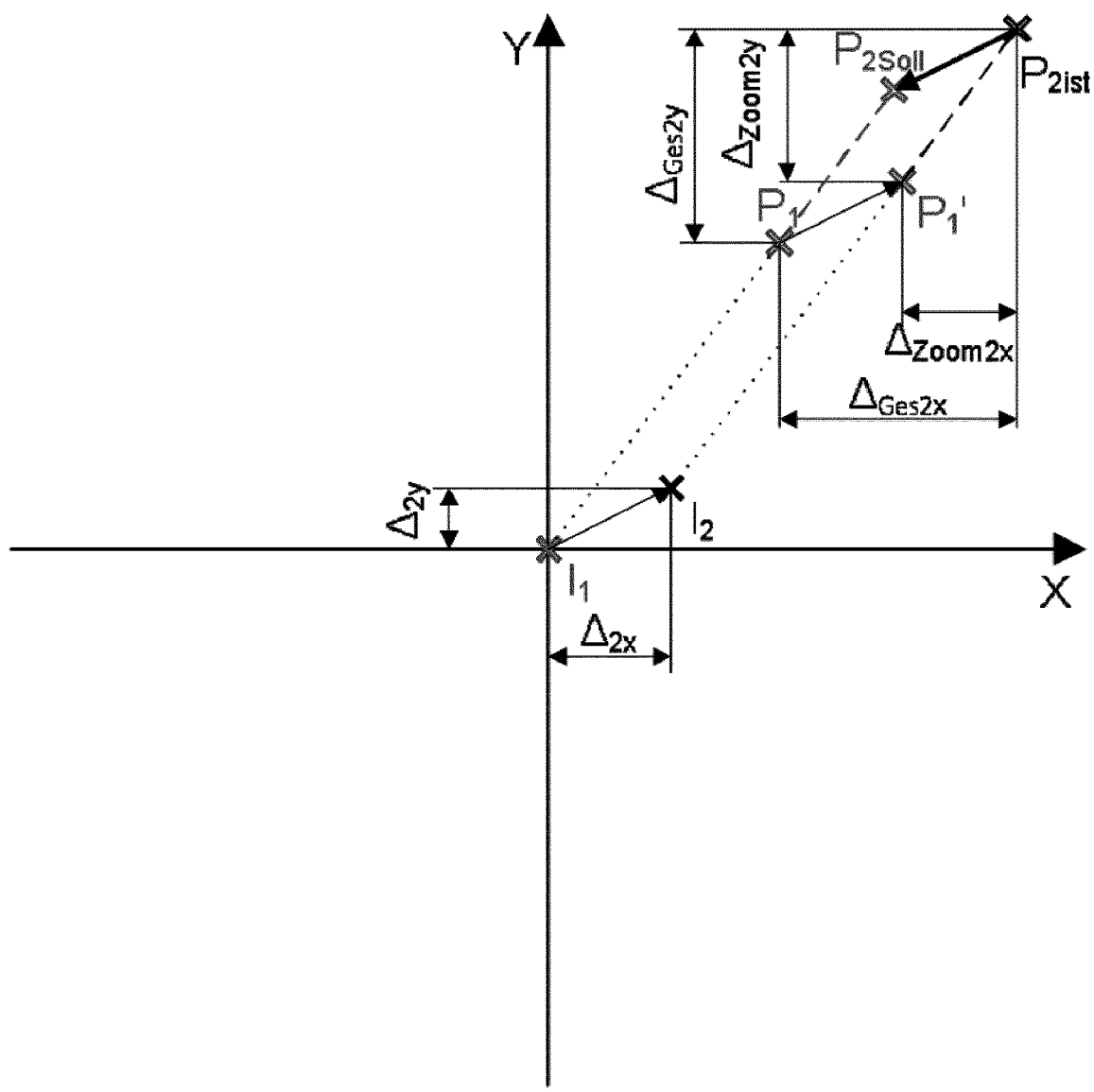
FIG. 14: shows a visualization of a second image following the first image visualized in FIG. 13.

FIG. 14 visualizes a second image following the first image visualized in FIG. 13, after the focal length of the zoom optical unit was changed. To this end, a component of the zoom optical unit was displaced along the displacement path aligned in a z-direction. In the second image, the POI is localized to a point $P_{2ist}$, which is ascertained using methods of image recognition. This yields a difference in relation to the point $P_1$ in the first image of $(\Delta_{Ges2x}, \Delta_{Ges2y})$. This difference comprises a displacement $(\Delta_{Zoom2x}, \Delta_{Zoom2y})$ caused by the change in the magnification factor and a displacement $(\Delta_{2x}, \Delta_{2y})$ caused by the statistical mechanical deviation. The change in the magnification factor represents a change in the imaging scale $\Delta\beta_{12}$, with $\Delta\beta_{12}=1.5$ applying in the shown example. Proceeding from the change in the imaging scale $\Delta\beta_{12}$ and the distance between $P_1$ and $I_1$, a point $P_{2soll}$ at which the POI would be imaged in the second image if there were no mechanical deviation of the zoom optical unit present is calculated according to the invention. The following applies in the example:

$$\Delta_{Zoom\_a2x}=\Delta\beta_{12} \cdot d_{a1x}$$

$$\Delta_{Zoom\_a2y}=\Delta\beta_{12} \cdot d_{a1y}$$

In general, the following applies:

$$\Delta_{Zoom\_ix}=\Delta\beta_j \cdot d_{kx}$$

$$\Delta_{Zoom\_iy}=\Delta\beta_j \cdot d_{ky}$$

The coordinates of the points $P_{2soll}$ and $P_{2ist}$ are compared. The difference in the x- and y-direction $(\Delta_{2x}, \Delta_{2y})$ represents a displacement error of the second image in relation to the first image, which is also exhibited by the invariant point that has been shifted between the two images. The second image is displaced counter to this displacement error before it is displayed to the operator, as a result of which the displacement error caused by the mechanical deviation is corrected. The same procedure likewise is carried out with further recorded images.

The magnification factor is ascertained proceeding from the real magnifications of all optical elements of the microscope and proceeding from movements of these optical elements in the z-direction. These information items are preferably ascertained when adjusting the microscope and stored in a storage medium.

Figure 15:
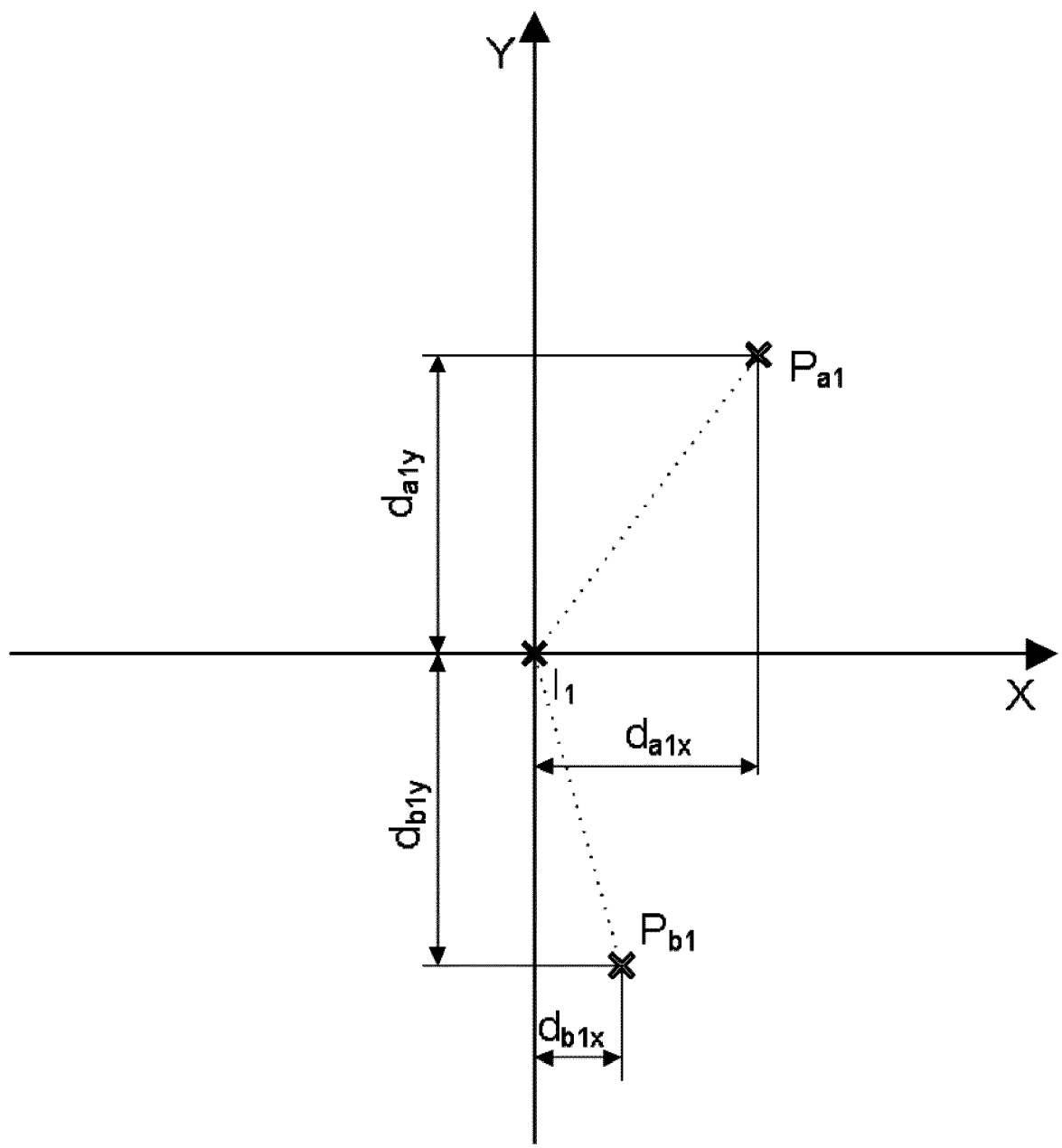
FIG. 15: shows a visualization of a first image recorded according to a second preferred embodiment of the method according to the invention.

FIG. 15 visualizes a first image of a microscope (not shown) equipped with a zoom optical unit, wherein this first image serves as a starting point to carry out a second preferred embodiment of the method, described with respect to FIG. 13 and FIG. 14, for determining or for correcting the mechanical deviation of the zoom optical unit. The magnification factor is assumed to be initially unknown in this second embodiment. Therefore, two POIs of the recorded object are selected, said POIs being localized in the first image at a point $P_{a1}$ and at a point $P_{b1}$, which are ascertained using methods of image recognition. An invariant point $I_1$ of the zoom optical unit is placed, as per definition and preceding calibration, into an image center of the first image.

Figure 16:
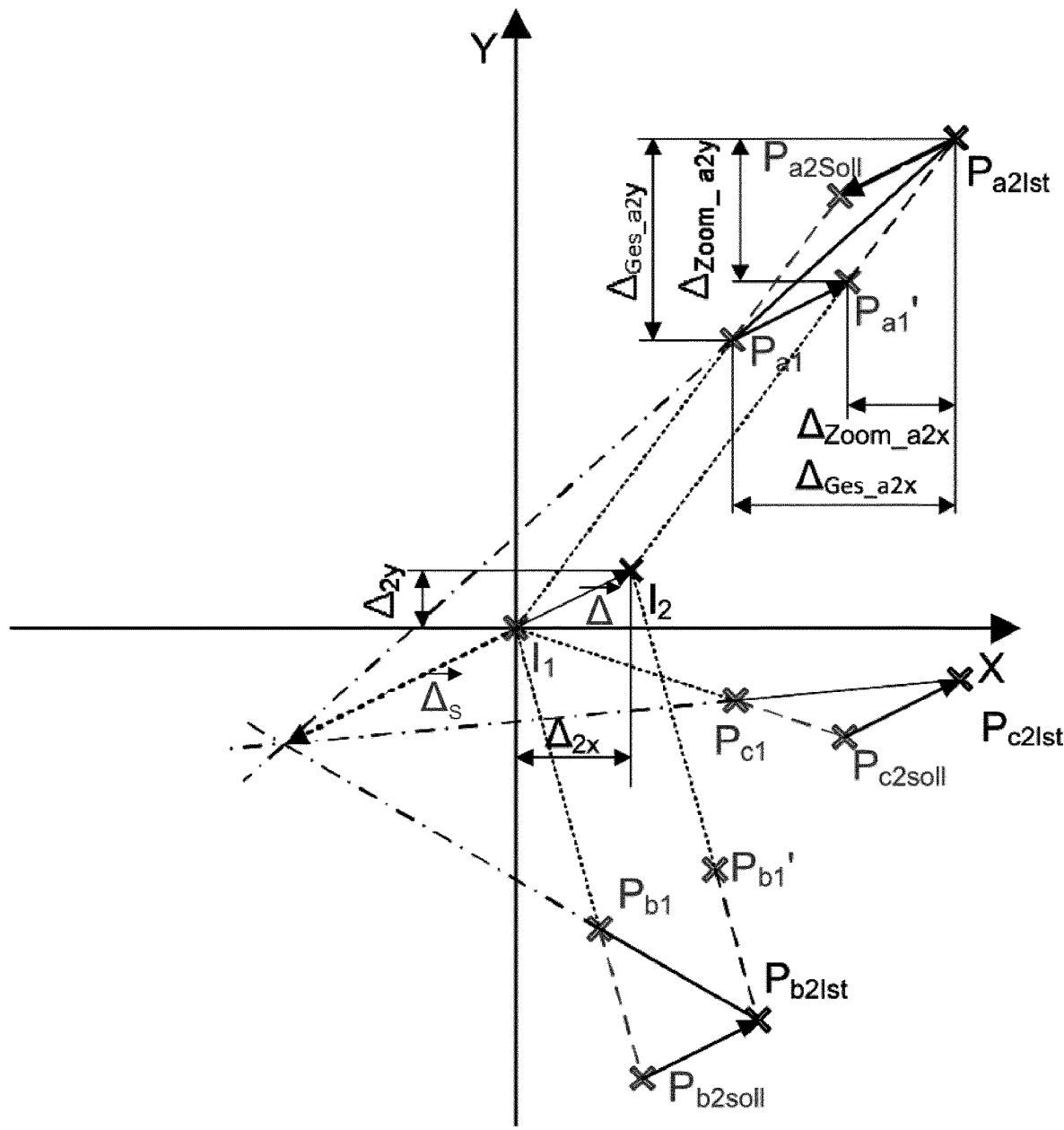
FIG. 16: shows a visualization of a second image following the first image visualized in FIG. 15.

FIG. 16 visualizes a second image following the first image visualized in FIG. 15, after the focal length of the zoom optical unit was changed. To this end, a component of the zoom optical unit was displaced along the displacement path aligned in a z-direction. The change in the magnification factor represents a change in the imaging scale $\Delta\beta_{12}$, with $\Delta\beta_{12}=1.5$ applying in the shown example. The two POIs are localized in the second image at a point $P_{a2Ist}$ and at a point $P_{b2Ist}$, which are ascertained using methods of image recognition. A straight line is produced through the points $P_{a1}$ and $P_{a2Ist}$ and a straight line is produced through the points $P_{b1}$ and $P_{b2Ist}$. A point of intersection of these two straight lines is ascertained. The distance of this point of intersection in the x- and y-direction from the image center is multiplied by the reciprocal of the change in the imaging scale, from which one had previously been subtracted:

$$\vec{\Delta}=\vec{\Delta}_S \cdot (\Delta\beta_i - 1)$$

A displacement error is ascertained proceeding therefrom, the former being corrected by displacement of the image. The change in the imaging scale $\Delta\beta_{12}$ is ascertained by equating the following vector equations:

$$\vec{\Delta}'=\vec{v}_{a12} - \vec{v}_{a1} \cdot (\Delta\beta_{12}-1)$$

$$\vec{\Delta}'=\vec{v}_{b12} - \vec{v}_{b1} \cdot (\Delta\beta_{12}-1)$$

Consequently, the following condition is used:

$$\vec{v}_{b12} - \vec{v}_{a12} = (\Delta\beta_{12}-1) \cdot (\vec{v}_{b1} - \vec{v}_{a1})$$

Figure 17:
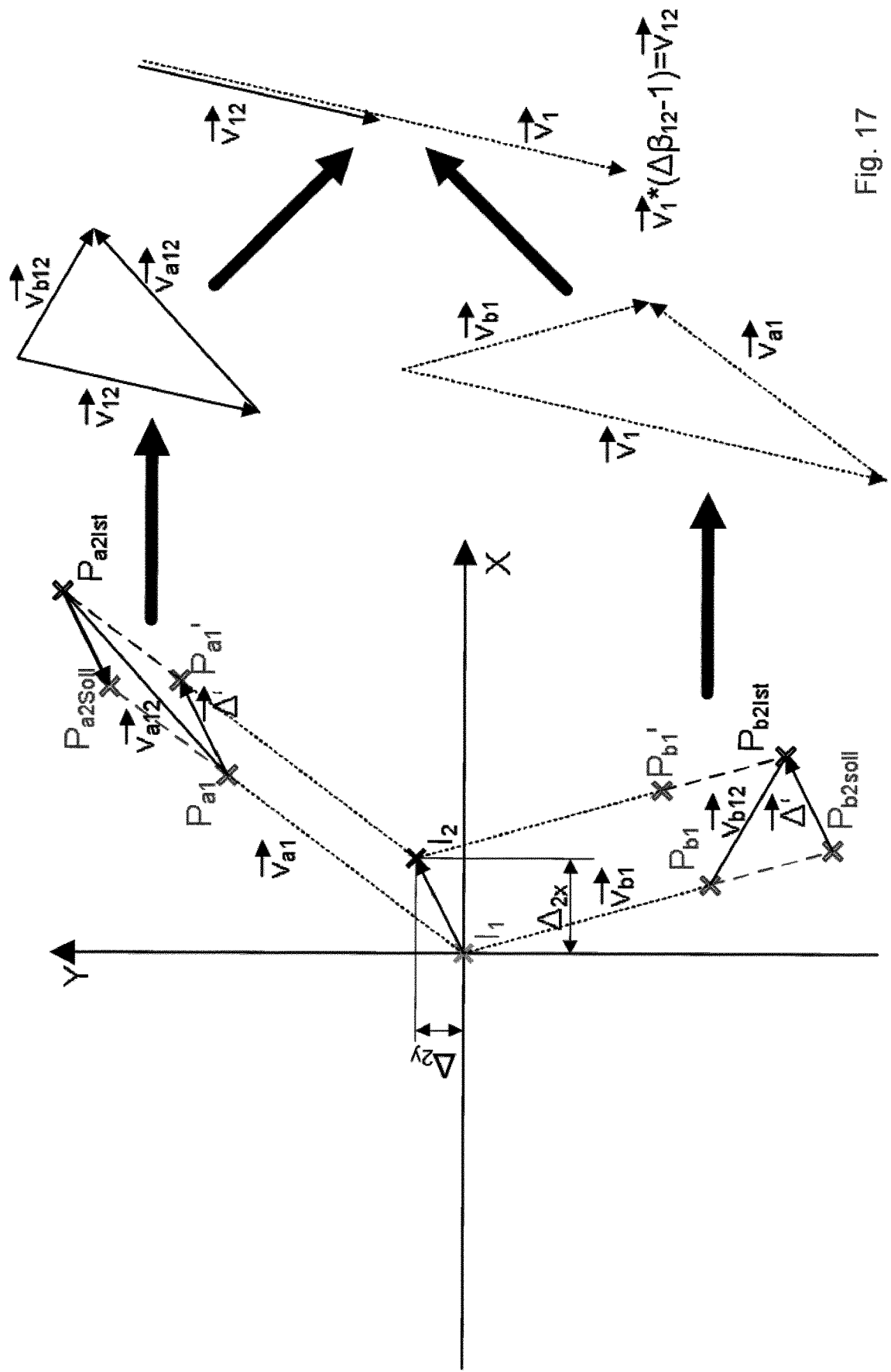
FIG. 17: shows a visualization complementing the second image shown in FIG. 16.

Complementing FIG. 16, FIG. 17 visualizes further method steps in relation to the second image. A vector $\vec{v}_{12}$ and a vector $\vec{v}_1$ are ascertained by way of vector addition:

$$\vec{v}_{b12} - \vec{v}_{a12} = \vec{v}_{12}$$

$$\vec{v}_{b1} - \vec{v}_{a1} = \vec{v}_1$$

The vectors $\vec{v}_{12}$ and $\vec{v}_1$ differ only in their magnitude by the factor $(\Delta\beta_{12}-1)$. Accordingly, there is a back calculation to the change in the imaging scale. The calculation is preferably applied in each case to all recorded images and a subsequent image.

The invention claimed is:

1. A method for determining a mechanical deviation on a displacement path of a zoom optical unit, wherein the zoom optical unit is arranged in a beam path between an object to be recorded and an electronic image sensor, and wherein the method comprises the following steps:

selecting at least one localizable region of the object to be imaged in an image recorded by the image sensor;

zooming the zoom optical unit, as a result of which a magnification factor of the zoom optical unit and a position of the localizable region in the image recorded by the image sensor are modified;

continuously detecting the localizable region in the image recorded by the image sensor while zooming the zoom optical unit and continuously determining coordinates of the changing position of the localizable region in the image recorded by the image sensor while zooming the zoom optical unit; and determining a displacement of the localizable region that occurred while zooming the zoom optical unit and remains after taking account of a displacement of the localizable region caused by the change in the magnification factor.

2. The method as claimed in claim 1, wherein an invariant point of the zoom optical unit is determined in the image recorded by the image sensor in order to ascertain the displacement of the localizable region caused by the change in the magnification factor.

3. The method as claimed in claim 1, wherein two of the localizable regions of the object to be imaged, which are detected while zooming the zoom optical unit, are selected in the image recorded by the image sensor, wherein the coordinates of the changing positions of the localizable regions in the image recorded by the image sensor while zooming the zoom optical unit are determined continuously and wherein the changing magnification factor or the displacement of the localizable regions caused by the change in the magnification factor are taken into account on the basis of the changing positions of the two localizable regions.

4. An electronic image recording apparatus for recording an image of an object, comprising:

an electronic image sensor;

a zoom optical unit, which is arranged in a beam path between the object to be recorded and the electronic image sensor; and a marking means for introducing an optical marking into the beam path at a position of the beam path that is situated between the object to be recorded and the zoom optical unit, wherein the marking means comprises a partly transmissive splitter element, which is arranged at the position of the beam path that is situated between the object to be recorded and the zoom optical unit, a reflected light illumination source, wherein the marking means comprises an imageable mark, which is arranged in a beam path between the reflected light illumination source and the partly transmissive splitter element, wherein the imageable mark is arranged in a stationary intermediate image plane.

5. The electronic image recording apparatus as claimed in claim 4, wherein it comprises an image processing unit that is embodied to carry out a method as claimed in claim 1.

6. An electronic image recording apparatus for recording an image of an object, comprising:

an electronic image sensor;

a zoom optical unit, which is arranged in a beam path between the object to be recorded and the electronic image sensor; and a marking means for introducing an optical marking into the beam path at a position of the beam path that is situated between the object to be recorded and the zoom optical unit, wherein the marking means comprises a partly transmissive splitter element, which is arranged at the position of the beam path that is situated between the object to be recorded and the zoom optical unit, a reflected light illumination source, wherein the marking means comprises an imageable mark, which is arranged in a beam path between the reflected light illumination source and the partly transmissive splitter element, wherein the marking means comprises a switchable stop, which forms the imageable mark and which comprises a multiplicity of individual elements arranged within an area, said individual elements being individually switchable from a transparent state into a non-transparent state, and vice versa.

7. The electronic image recording apparatus as claimed in claim 4, wherein the marking means comprises a laser light source which is directed on the partly transmissive splitter element.

8. The electronic image recording apparatus as claimed in claim 4, wherein it furthermore comprises a marking sensor (32) for receiving the light that has passed through the zoom optical unit (03) and that includes the optical marking.

* * * * *